(12) United States Patent
Shinozaki et al.

(10) Patent No.: US 7,218,816 B2
(45) Date of Patent: May 15, 2007

(54) OPTICAL FIBER GRATING PART

(75) Inventors: Atsushi Shinozaki, Tokyo (JP); Yasuhiro Isaka, Tokyo (JP); Kana Chida, Tokyo (JP); Toshihiko Ota, Tokyo (JP)

(73) Assignee: The Furukawa Electric Co., Ltd. (JP)

( * ) Notice: Subject to any disclaimer, the term of this patent is extended or adjusted under 35 U.S.C. 154(b) by 0 days.

(21) Appl. No.: 10/675,119

(22) Filed: Sep. 30, 2003

(65) Prior Publication Data

US 2005/0249460 A1 Nov. 10, 2005

(30) Foreign Application Priority Data

Oct. 1, 2002 (JP) .............................. 2002-288827

(51) Int. Cl.
G02B 6/34 (2006.01)
G02B 6/00 (2006.01)

(52) U.S. Cl. .......................................... 385/37; 385/13

(58) Field of Classification Search .................. 385/37, 385/10, 12, 13, 14, 55, 62, 65, 70
See application file for complete search history.

(56) References Cited

U.S. PATENT DOCUMENTS

| | | | | |
|---|---|---|---|---|
| 5,694,503 A | * | 12/1997 | Fleming et al. ............... | 385/37 |
| 6,108,470 A | * | 8/2000 | Jin et al. ...................... | 385/37 |
| 6,522,809 B1 | * | 2/2003 | Takabayashi et al. ......... | 385/37 |
| 6,529,671 B2 | * | 3/2003 | MacDougall ................ | 385/137 |
| 6,603,900 B1 | * | 8/2003 | Bookbinder et al. .......... | 385/37 |
| 6,807,341 B2 | * | 10/2004 | Albert .......................... | 385/37 |
| 2001/0006570 A1 | * | 7/2001 | Kashihara et al. ............ | 385/24 |
| 2003/0081925 A1 | * | 5/2003 | Albert .......................... | 385/137 |
| 2003/0108286 A1 | * | 6/2003 | Albert .......................... | 385/37 |
| 2004/0156587 A1 | * | 8/2004 | Albert .......................... | 385/37 |

FOREIGN PATENT DOCUMENTS

| JP | 2000-347047 | * | 2/1999 |
|---|---|---|---|
| JP | 2000-347047 | | 12/2000 |

* cited by examiner

*Primary Examiner*—Kaveh Kianni
(74) *Attorney, Agent, or Firm*—Cantor Colburn LLP

(57) ABSTRACT

An optical fiber grating part including an elongated pedestal, and a base plate installed on said pedestal, and having a different coefficient of linear thermal expansion from said pedestal, and an optical fiber passing through said pedestal, and connected to connection points installed on said pedestal or said base plate located apart from each other in the longitudinal direction of said pedestal, and having an optical fiber grating located between said connection points, wherein a predetermined tensile force is added to said optical fiber grating, and said pedestal and said base plates thermally expand or thermally shrink independently in the longitudinal direction of said pedestal, and an extension line of an axis of said optical fiber joining said connection points passes through a contact surface between said pedestal and said base plate.

8 Claims, 2 Drawing Sheets

OPTICAL FIBER GRATING PART

FIELD OF THE INVENTION

The present invention relates to the field of an optical fiber part or an optical communication, especially relates to an optical fiber grating part suitable for the optical communication.

RELATED ART

An optical fiber grating is produced with changing an effective index of reflection of an optical filter periodically along the optical axis, and the changing period of the index of reflection is normally called a brag grating period. It is known as a production method for the optical fiber grating to project an ultraviolet light with interference patterns to change an optical induced index of reflection in the core of the optical fiber.

The optical fiber grating can be used as a single wavelength filter having a high performance for selecting the wavelength because the optical fiber grating can reflect a light beam in a relatively narrow wavelength band with a brag reflection wavelength (a grating pitch) $\lambda$ as a center wavelength determined by a brag grating period $\Lambda$ and the effective index of reflection of the core n. There is the following relationship among the brag reflection wavelength $\lambda$, the effective index of reflection n and the brag grating period $\Lambda$.

$$\lambda = 2n\Lambda \quad (1)$$

However both the effective index of reflection n and the brag reflection wavelength $\lambda$ have temperature dependence. For example, if the temperature is raised, the effective index of reflection n has a positive increasing rate and the brag grating period $\Lambda$ has a positive increasing rate because the brag grating period $\Lambda$ is in proportion to a coefficient of linear thermal expansion of the core. Therefore it is necessary to control the temperature dependence of the brag reflection wavelength $\lambda$ so as to apply the optical fiber grating part to the high density WDM system.

In order to control the temperature dependence of the brag reflection wavelength $\lambda$, a temperature compensation optical fiber grating part is proposed in Japanese patent publication #2000-347047(the document 1).

The optical fiber grating part specified in the document 1 is illustrated in FIG. 5. The temperature compensation of the optical fiber grating part of the document 1 is realized by installing two base plates 2 that have a high coefficient of linear thermal expansion on both sides of a pedestal 1 that has a low coefficient of linear thermal expansion, and fixing an optical fiber 4 with each boss 3 of the base plate 2, and adding a predetermined tensile force to an optical fiber grating 5.

When the temperature is raised, the base plates 2 having higher coefficient of linear thermal expansion than the pedestal 1 extend towards each other. Then pre-tension of the optical fiber 4 is released, and the brag grating period $\Lambda$ of the optical fiber grating 5 becomes small. On the contrary, it is possible to control (compensate) the temperature dependence of the brag reflection wavelength $\lambda$ because, as shown in the formula (1), the effective index of reflection of the core n in the optical fiber grating 5 has the positive temperature dependence. When the temperature is lowered, the change of the brag reflection wavelength $\lambda$ is also controlled.

SUMMARY OF THE INVENTION

The purpose of the present invention is to provide an optical fiber grating part that can keep a desired brag reflection wavelength $\lambda$ for a long period even if an environmental temperature is changed.

The first embodiment of the present invention is an optical fiber grating part comprising;
an elongated pedestal,
a base plate installed on said pedestal, and having a different coefficient of linear thermal expansion from said pedestal, and
an optical fiber passing through said pedestal, and connected to connection points installed on said pedestal or said base plate located apart from each other in the longitudinal direction of said pedestal, and having an optical fiber grating located between said connection points,
wherein a predetermined tensile force is added to said optical fiber grating, and
said pedestal and said base plates thermally expand or thermally shrink independently in the longitudinal direction of said pedestal, and
an extension line of an axis of said optical fiber joining said connection points passes through a contact surface between said pedestal and said base plate.

Another embodiment of the present invention is an optical fiber grating part comprising;
an elongated pedestal,
a base plate installed on said pedestal, and having a different coefficient of linear thermal expansion from said pedestal, and
an optical fiber passing through said pedestal, and connected to connection points installed on said pedestal or said base plate located apart from each other in the longitudinal direction of said pedestal, and having an optical fiber grating located between said connection points,
wherein a predetermined tensile force is added to said optical fiber grating, and
said pedestal and said base plates thermally expand or thermally shrink independently in the longitudinal direction of said pedestal, and
an offset distance between said connection point and a contact surface of said pedestal and said base plate is minimized.

Another embodiment of the present invention is the optical fiber grating part,
wherein a pair of said base plates are installed apart from each other in the longitudinal direction of said pedestal and each said base plate has said connection points respectively.

Another embodiment of the present invention is the optical fiber grating part,
wherein a dimension of said connection part is 1.0015 times or more larger than that of said connection concavity in the longitudinal direction of said pedestal.

Another embodiment of the present invention is the optical fiber grating part,
wherein said connection part is assembled with said connection concavity with press fitting.

Another embodiment of the present invention is the optical fiber grating part,
wherein said connection part is assembled with said connection concavity with freeze fitting.

Another embodiment of the present invention is the optical fiber grating part,
wherein said pedestal is made of the inber and said base plate is made of aluminum.

DETAILED DESCRIPTION OF THE INVENTION

Figure 1:
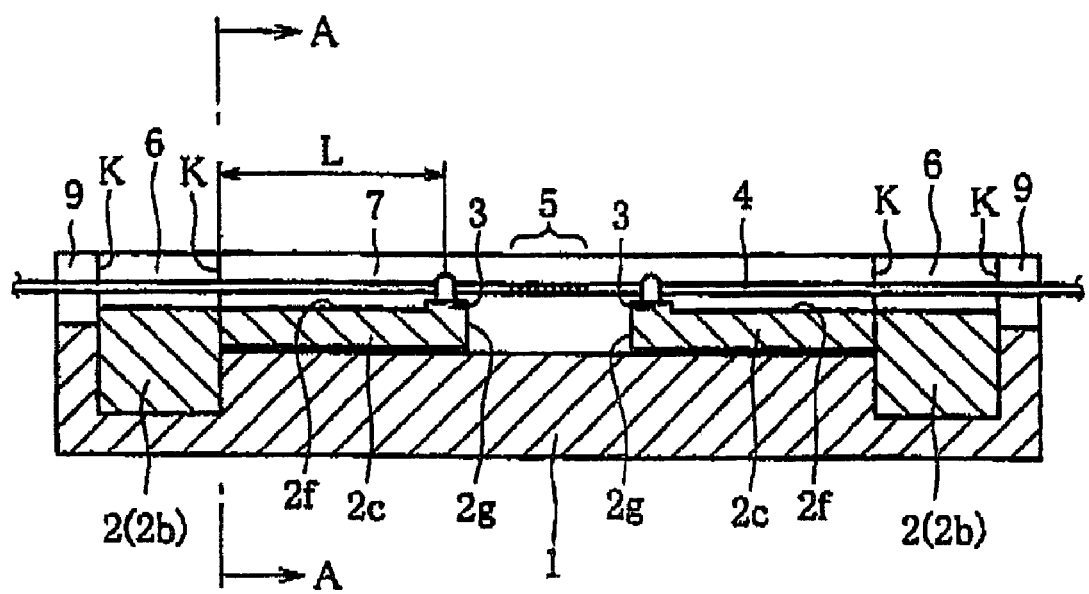
FIG. 1 is a sectional schematic view for illustrating one embodiment of the optical fiber grating part of the present invention.
Figure 2:
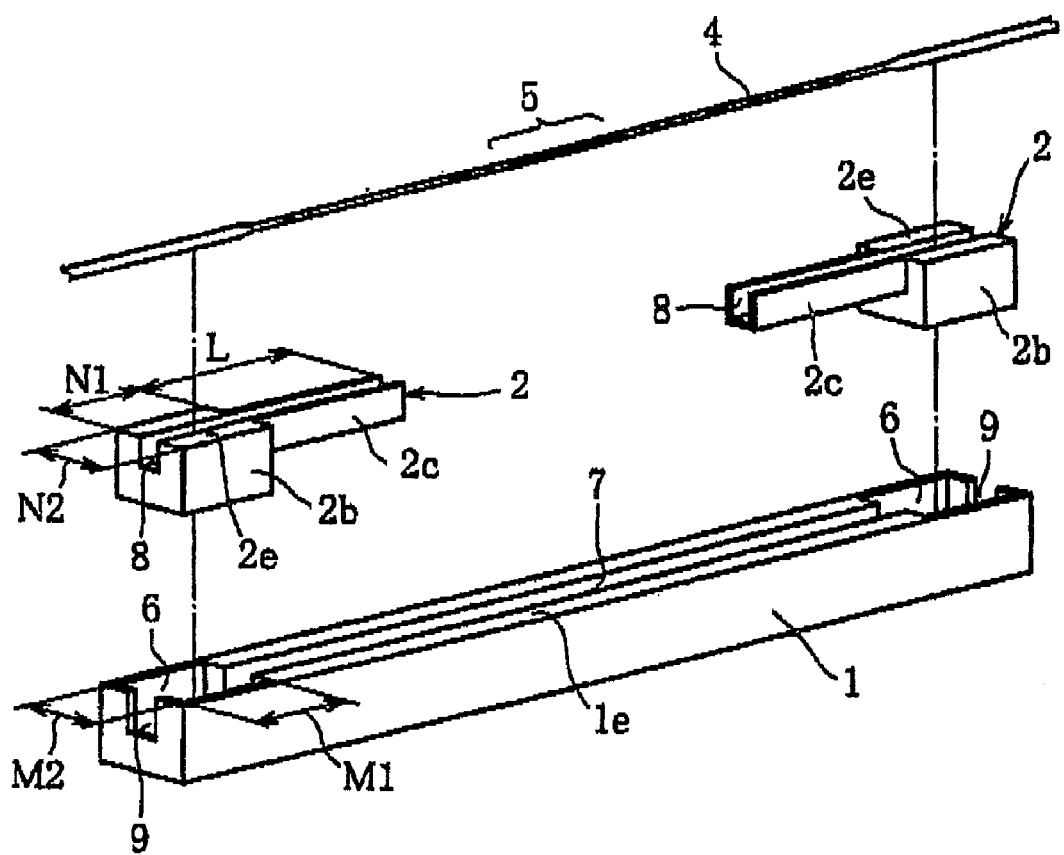
FIG. 2 is a perspective view for illustrating disassembly of the optical fiber grating part as shown in FIG. 1.

An embodiment of an optical fiber grating part of the present invention is hereinafter explained with referring to the attached drawings. FIG. 1 is a sectional schematic view for illustrating one embodiment of the optical fiber grating part of the present invention. FIG. 2 is a perspective view for illustrating the disassembly of the optical fiber grating part as illustrated in FIG. 1. The same part number as the prior art is used for the parts that have the same function as the prior art.

The optical fiber grating part has a pedestal 1 with a long rectangular sectional shape, and the pedestal 1 is made of the "Inber 36N" (a trademark). Connection concavities 6 with a rectangular sectional shape are made on both sides of the pedestal 1. The pedestal 1 also has a longitudinal groove 7 that connects the both connection concavities 6. Depth of the longitudinal groove 7 is shallower than that of the connection concavity 6 and width of the longitudinal groove 7 is narrower than that of the connection concavity 6.

Two base plates 2 are installed on the both side of the pedestal 1, and the base plate 2 is made of aluminum. More specifically each of the base plate 2 includes connection parts 2b contained in the connection concavities 6 and beams 2c extending from the upper side of the connection parts 2b and contained in the longitudinal groove 7.

A hypothetical surface including two contact surfaces between the undersurface of the connection part 2b and the bottom of the concavity 6 is called a principle surface.

The connection part 2b is machined a little bit larger than the connection concavity 6 and assembled with the connection concavity 6 with press fitting. When a longitudinal dimension of the connection concavity 6 is M1 and a longitudinal dimension of the connection part 2b is N1, N1 shall preferably 1.0015 times or more larger than the M1. If N1 is smaller than this dimension, connection of the connection parts 2b and the connection concavity 6 is loosed by the change of the environmental temperature because of difference of the coefficient of linear thermal expansion, and a risk that the connection part 2b moves in the connection concavity 6 is increased.

If this embodiment is explained in more detail, the dimension M1 of the connection concavity 6 of the pedestal 1 is 1.3 mm−0.005 mm to −0.01 mm, and the dimension N1 of the connection parts 2b of the base plate 2 is 1.3 mm+0.01 mm to +0.05 mm. The connection part 2b of the base plate 2 is assembled with the connection concavity 6 of the pedestal 1 with press fitting. Ratio of the dimensions between the connection concavity 6 of the pedestal 1 and the connection part 2b of the base plate 6 is 1.008

The width dimension M2 of the connection concavity 6 and the width dimension N2 of the connection part 2b can be determined according to the general fitting tolerance.

Each beam 2c of the base plate 2 is not fixed to the inner surface of the longitudinal groove 7, and a top surface 2e of the base plate 2 has the same level as a top surface 1e of the pedestal 1. Therefore a depth of the connection concavity 6 is the same as a height of the connection part 2b, and a depth of the longitudinal groove 7 is almost the same as a height of the beam 2c.

In addition to it, another longitudinal groove 8 is made on the top surface of the base plate 2. The longitudinal groove 8 extends from the connection part 2b through the beam 2c, the longitudinal groove 8 has an enough size where the optical fiber 4 is inserted. A boss 3 is installed at the edge of the beam 2c on the bottom of the longitudinal groove 8. On the other hand, notches 9 are set at the both edges of the pedestal 1, and the notch 9 has almost the same size as the longitudinal groove 8 of the base plate 2.

As shown in FIG. 1, the optical fiber 4 has an optical fiber grating 5 located in the center of both bosses 3 on the base plates 2, and the optical fiber 4 passes through the pedestal 1. Therefore, the optical fiber 4 passes through the longitudinal groove 8 of the base plates 2 and the notches 9 of the pedestal 1.

The optical fiber 4 is fixed to the bosses 3 of the base plates, for example, with using an adhesive agent, and the most part of the optical fiber 4 is suspended over the bottom surface 2f of the longitudinal groove 8 and the bottom surface of the notch 9.

Therefore the optical fiber 4 is fixed only to the bosses 3, and the bosses 3 actually determine the fixing points for the optical fiber 4. Low melting point glass, solder or synthetic resin can be applied as the adhesive agent.

More specifically, the optical fiber 4 is set with using tools that can add a desired tensile force when the optical fiber 4 is fixed with the adhesive agent. The optical fiber 4 is adhered to the bosses 3 with adding a tensile force so as to obtain the desired brag reflection wavelength λ taking into account the effect of curing shrinkage of the adhesive resin. At this moment, it is important to determine the tensile force, and the dimension of the pedestal 1 and the base plate 2 so as to keep the tensile force to the optical fiber grating 5 within an allowable range with considering difference of the coefficient of linear thermal expansion between the pedestal 1 and the base plate 2 in the environmental temperature range (for example, from −20 degrees Celsius to 65 degrees Celsius).

Therefore, regarding difference of the coefficient of linear thermal expansion between the pedestal 1 and the base plate 2, the length L from the connection part 2b of the base plate 2 to the beam 2c of the boss 3 relates to the thermal expansion or thermal shrinkage. If the pedestal 1 is made of the inber and the base plate 2 is made of aluminum, the coefficient of linear thermal expansion of the inber is low and around $1 \times 10^{-6}$/degree Celsius or less, the coefficient of linear thermal expansion of aluminum is round $20 \times 10^{-6}$/degree Celsius.

Therefore movement of the boss 3 mostly relates to the thermal expansion or thermal shrinkage of aluminum, and the relative moving distance is almost in proportion to the change of the temperature of the beam 2c and the length L. For example, if the environmental temperature is raised from the room temperature by 40 degrees Celsius and the length L is 10 mm, the beam 2c will expand relatively by around 8 μm. In the case as shown in FIG. 1, the distance between two beams 2c is reduced around by 16 μm because they are facing each other. Accordingly the tensile force of the optical fiber grating is reduced, and the brag grating period Λ becomes small. Therefore the brag grating period Λ has negative temperature dependence. On the other hand, the effective index of reflection n of the optical fiber 4 has positive temperature dependence. Therefore such negative temperature dependence and positive temperature dependence cancels each other, and it is possible to control (compensate) the brag grating period Λ determined by the above-mentioned formula (1). For example, the optical fiber based on silica has the temperature dependence around from 0.01 to 0.015 nm/degrees Celsius. On the contrary, if the environmental temperature becomes lower than the room temperature, two beams 2c move away. Accordingly the tensile force of the optical fiber grating 5 is increased, and the brag grating period Λ becomes larger. Then, the effective index of reflection n of the optical fiber becomes smaller. Therefore the temperature dependence of the brag reflection wavelength λ can be compensated.

Actually the appropriate length L of the beam 2c and appropriate tensile force of the optical fiber grating 5 are determined with taking into account the effective index of reflection n of the optical fiber 4, the coefficient of linear thermal expansion of the pedestal 1 and the base plate 2, and the result of the experiment.

As mentioned above, even though the tensile force of the optical fiber grating 5, that is, the optical fiber 4 is increased or decreased according to the change of the environmental temperature, such fluctuation of the tensile force of the optical fiber 4 does not add the moment load to the connection part 2b of the base plate 2.

Therefore as shown in FIG. 1, the base plate 2 (an adhesion point) to which the optical fiber 4 is adhered is contained in the longitudinal groove 7 of the pedestal 1. The tensile force transmitted from the optical fiber 4 to the base plate 2 is received by the pedestal 1 with using one side of the contact surface K of the connection concavity 6 that contains the connection part 2b of the base plate 2, that is, with using the contact surface K close to the optical fiber grating 5. The contact surface K is located in a vertical direction of the principle surface.

Figure 5:
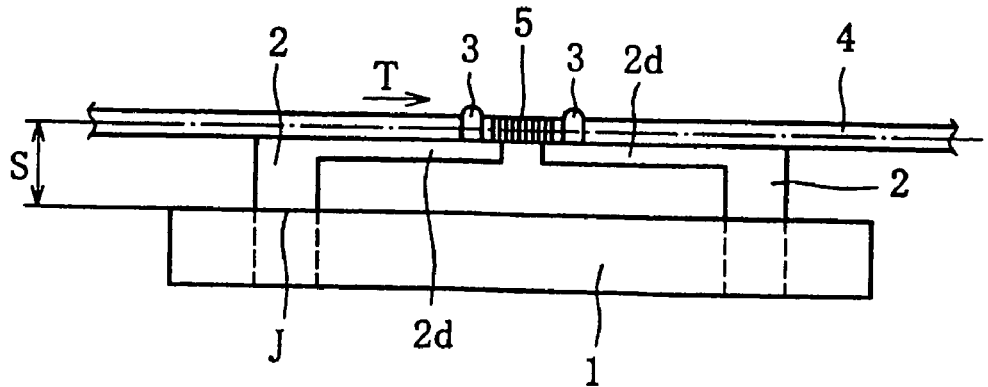
FIG. 5 is a schematic view for illustrating a conventional optical fiber grating part.

However as shown in FIG. 5, the connection surface J of the base plate 2 facing the pedestal 1 has a large moment load because of repeated expansion and shrinkage due to the difference of the coefficient of linear thermal expansion between the pedestal 1 and base plate 2 so as to compensate the temperature dependence of the brag reflection wavelength λ. In the above-mentioned optical fiber grating part, the connection surface J and the connection part 3 for the optical fiber 4 are offset, and the connection surface J has the moment load of S×T ("S" is the offset distance, and "T" is the tensile force of the optical fiber 4.).

Such moment load causes deformation or misalignment. Therefore there is a risk that the brag reflection wavelength λ is changed according to the change of the pre-tension of the optical fiber 4 during usage of the above-mentioned optical fiber grating part for a long time.

The optical fiber grating part can be used in a stable condition because the predetermined pre-tensile force to the optical fiber grating is kept for a long time by applying the construction as shown in FIG. 1.

Figure 3:
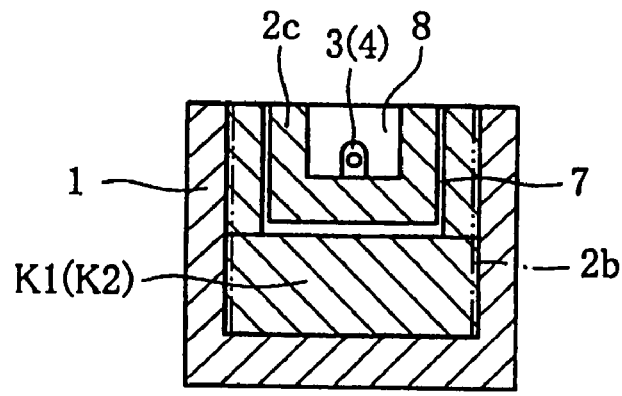
FIG. 3 is a sectional view for illustrating one embodiment of the optical fiber grating part of the present invention.

As clearly shown in FIG. 3, the contact surface K has a horseshoe shape, and the action line of the reactive force of the tensile force that is added to the optical fiber 4 passes through the contact surface K.

Therefore, according to the above-mentioned construction, the tensile force does not create the moment load to the connection part 2b of the base plate 2, and the fitting condition between the connection part 2b of the base plate 2 and the connection concavity 6 of the pedestal 1 can be stably kept. As a result, the connection point between the pedestal 1 and the base plate 2 is stably kept for a long time, and the pre-tensile force to the optical fiber 4 does not change.

More specifically, even if the tensile force is always added to the optical fiber 4 or such tensile force is changed according to the change of the environmental temperature, the reactive force of the tensile force from the connection part 2b of the base plate 2 is vertically received by the contact surface K of the pedestal 1, and the tensile force is dispersed in a large area of the contact surface K. The boss 3 for the optical fiber 4 is preferably located at the center of the section of the pedestal 1. However the location of the boss 3 is not limited to the above-mentioned location, and it is allowed that at least the boss 3, that is, the contact point of the optical fiber 4 is located within the area of the longitudinal groove 7.

Therefore even if the tensile force of the optical fiber 4 is changed according to the change of the environmental temperature, the connection part 2b of the base plate 2 contacts stably to the pedestal 1 for a long time, and it is possible to achieve a stable temperature compensation for the brag reflection wavelength λ.

Figure 4:
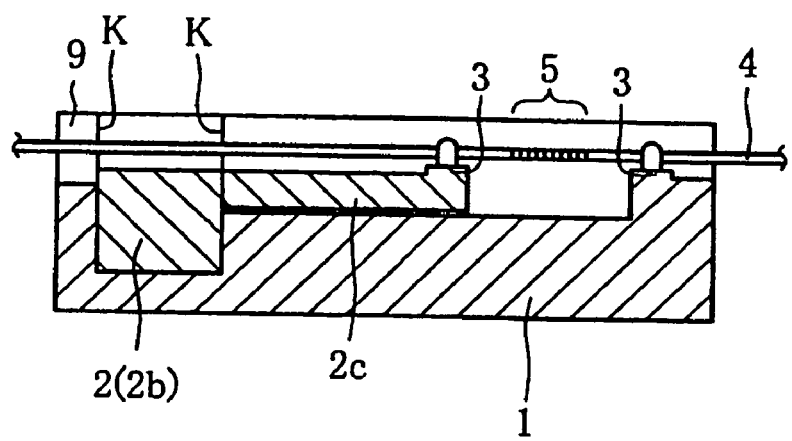
FIG. 4 is a schematic view for illustrating another embodiment of the optical fiber grating part of the present invention.

Though the above-mentioned embodiment has two base plates, it is clear that an embodiment having one base plate is applicable. In this case, as shown in FIG. 4, the optical fiber 4 is adhered to the boss 3 of the base plate 2 and the boss 3 located on the bottom of the longitudinal groove 7 of the pedestal 1 respectively. In this case, it is important that the boss 3, that is, the contact point of the optical fiber 4 is located completely within the area of the longitudinal groove 7 of the pedestal 1.

Though the base plate 2 is assembled with the pedestal 1 with using press fitting in the above-mentioned embodiment, the base plate 2 can also be assembled with the pedestal 1 with using freeze fitting instead of press fitting.

Though the inber is used for the material of the pedestal 1, and aluminum is used for the material of the base plate 2 in the above-mentioned embodiment, a combination of the inber and stainless steel or a combination of titanium and aluminum is also possible. A coefficient of linear thermal expansion of the stainless steel is lower than that of the aluminum, however, the stainless steel has a merit such as high strength. The titanium is less expensive than the inber, however, a coefficient of linear thermal expansion of the titanium is higher than that of the inber. These factors shall be fully considered because the construction size relates to the coefficient of linear thermal expansion.

Further more, though all of the base plate 2 does not need to be contained in the pedestal 2, there is a merit that deformation of the base plate 2 by the external force can be prevented if all of the base plate 2 is completely contained in the pedestal 1.

Though the connection concavity 6 is made in the pedestal 1 and the connection part 2b is inserted in the connection concavity 6 in the above-mentioned embodiment, it is also possible that a connection concavity is made in the base plate 2 and a connection part is inserted in the connection concavity.

In the optical fiber grating part of the present invention, the moment load due to the tensile force of the optical fiber is not created because the base plate is connected vertically to the pedestal that holds the optical fiber in the point of the tensile force direction of the optical fiber, and the optical fiber passes through the connection point. Therefore even if the environmental temperature is changed, the fitting condition between the base plate and the pedestal is stably kept, and the pre-tensile force to the optical fiber can be kept for a long time. Accordingly the brag reflection wavelength λ with extremely high accuracy can be kept for a long time. Therefore the optical fiber grating part can be used for a long time as a temperature compensation narrow band optical filter for the high density WDM system.

What is claimed is:

1. An optical fiber grating part comprising:
   an elongated pedestal;
   a base plate installed on said pedestal, and having a different coefficient of linear thermal expansion from said pedestal; and
   an optical fiber passing through said pedestal, and connected to connection points installed on said pedestal and said base plate located apart from each other in the longitudinal direction of said pedestal, and having an optical fiber grating located between said connection points,
   wherein a predetermined tensile force is added to said optical fiber grating, and said pedestal and said base plate thermally expand or thermally shrink independently in the longitudinal direction of said pedestal, and
   an extension line of an axis of said optical fiber joining said connection points passes through a contact surface (K) of said pedestal and a connection part of said base plate, wherein a dimension of said connection part of said base plate is 1.0015 times or more larger than that of a connection concavity in the longitudinal direction of said pedestal.

2. The optical fiber grating part as claimed in claim 1, wherein said connection part of said base plate is assembled with a connection concavity in the longitudinal direction of said pedestal with press fitting.

3. The optical fiber grating part as claimed in claim 1, wherein said connection part of said base plate is assembled with a connection concavity in the longitudinal direction of said pedestal with freeze fitting.

4. The optical fiber grating part as claimed in claim 1, wherein said pedestal is made of the inber and said base plate is made of aluminum.

5. An optical fiber grating part comprising:
   an elongated pedestal;
   a pair of base plates installed on said pedestal apart from each other in the longitudinal direction of said pedestal and having a different coefficient of linear thermal expansion from said pedestal; and
   an optical fiber passing through said pedestal, and connected to connection points installed on each of said base plates, and having an optical fiber grating located between said connection points,
   wherein a predetermined tensile force is added to said optical fiber grating, and
   said pedestal and said base plates thermally expand or thermally shrink independently in the longitudinal direction of said pedestal, and
   an extension line of an axis of said optical fiber joining said connection points passes through a contact surface (K) of said pedestal and a connection part of each of said base plate, wherein a dimension of said connection part of each of said base plates is 1.0015 times or more larger than that of a connection concavity in the longitudinal direction of said pedestal.

6. The optical fiber grating part as claimed in claim 5, wherein said connection part of each of said base plates is assembled with a connection concavity in the longitudinal direction of said pedestal with press fitting.

7. The optical fiber grating part as claimed in claim 5, wherein said connection part of each of said base plates is assembled with said connection concavity in the longitudinal direction of said pedestal with freeze fitting.

8. The optical fiber grating part as claimed in claim 5, wherein said pedestal is made of the inber and said base plates are made of aluminum.

* * * * *